No. 769,263. PATENTED SEPT. 6, 1904.
J. HERMAN.
PROCESS OF UTILIZING WASTE FURNACE GASES AND SIMULTANEOUSLY REDUCING ORES.
APPLICATION FILED APR. 29, 1904.
NO MODEL.

Witnesses
Inventor
John Herman.
By James J. Sheehy, Attorney

No. 769,263.

Patented September 6, 1904.

UNITED STATES PATENT OFFICE.

JOHN HERMAN, OF BISBEE, ARIZONA TERRITORY.

PROCESS OF UTILIZING WASTE FURNACE-GASES AND SIMULTANEOUSLY REDUCING ORES.

SPECIFICATION forming part of Letters Patent No. 769,263, dated September 6, 1904.

Application filed April 29, 1904. Serial No. 205,613. (No specimens.)

*To all whom it may concern:*

Be it known that I, JOHN HERMAN, a citizen of the United States, residing at Bisbee, in the county of Cochise and Territory of Arizona, have invented new and useful Improvements in Processes of Utilizing Waste Furnace-Gases and Simultaneously Reducing Ores, of which the following is a specification.

My invention pertains to the use of waste furnace-gases in conjunction with oxidized ores or metallic oxids with a view of utilizing the calorific value of the gases and reducing metallic oxids to globules of metals at one and the same time, the reduction of the metallic oxids to metallic globules being advantageous in that it adapts the metals for concentration by well-known processes.

With the foregoing in mind the invention will be fully understood from the following description and claim when taken in connection with the accompanying drawings, forming part of this specification, in which—

Figure 1:
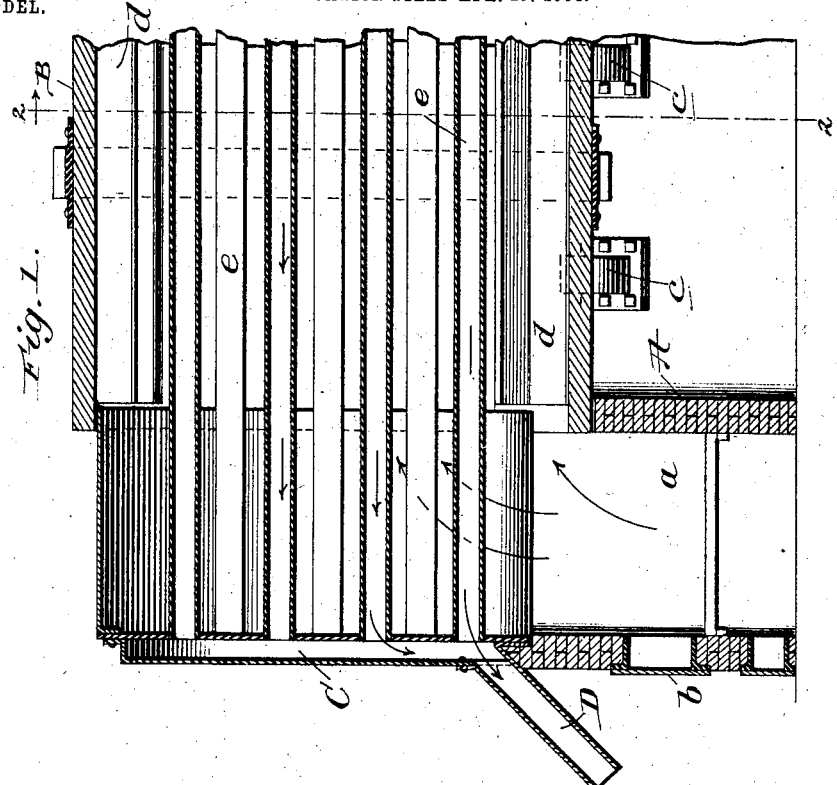
Figure 2:
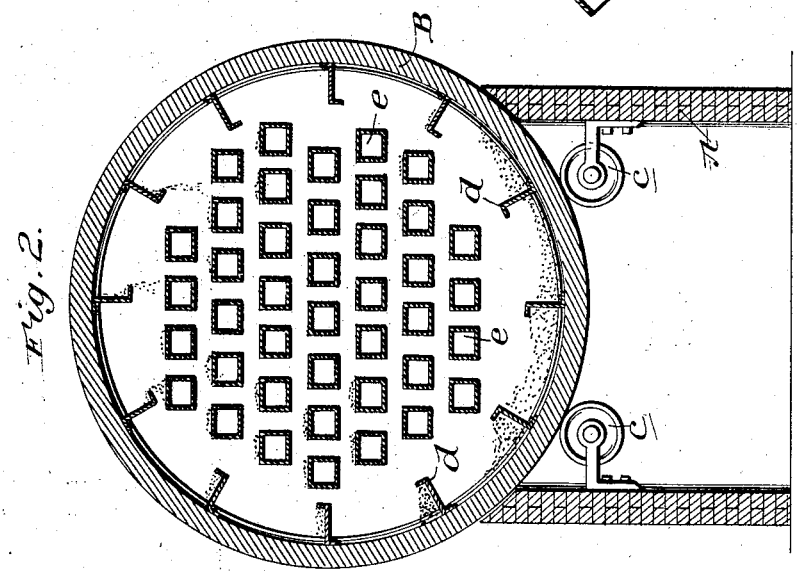

Figures 1 and 2 are views of the apparatus which I prefer to employ in carrying out my process.

In one embodiment of my invention I make use of metallic oxids—such, for instance, as roasted ore—through or over which I pass furnace-gases which would otherwise go to waste. When this is done, the carbon monoxid present is oxidized to carbon dioxid, and the metallic oxids are reduced either to lower oxids or to the metallic state. When desirable, the ore may then be reoxidized by the admission of air, and thereby adapted to do its work continuously for an indefinite period. Incident to the passage of the waste furnace-gases through or over the roasted ore or other metallic oxids ten thousand and fifty British thermal units of heat are liberated for each pound of unsaturated carbon in the gases, and the following are typical reactions, viz:

$$Fe_2O_3 + CO = 2FeO + CO_2.$$
$$2CuO + CO = Cu_2O + CO_2$$

and $$Cu_2O + CO = 2Cu + CO_2.$$

The reoxidation is as follows:

$$2FeO + O = Fe_2O_3.$$
$$2Cu + O = Cu_2O -$$

and $$Cu_2O + O = 2CuO.$$

The heat generated in the manner described may be used for heating air-blasts for furnaces or for heating boilers or other devices or for general heating purposes.

As will be readily appreciated, the embodiment of my invention described is materially advantageous because the full calorific value of the waste furnace-gases is utilized instead of a mere fraction of such value.

In copper-matting and lead-blast furnace practice at least three-fourths down to two-thirds of the carbon in the charge is burned to carbon monoxid instead of being burned to carbon dioxid, with the result that half of the fuel value of the entire charge is lost.

This will be appreciated when it is remembered that the calorific value of carbon when burned to carbon dioxid is eight thousand and eighty, while it is only two thousand four hundred and seventy when carbon monoxid is produced.

As furnace-gases will not unite with air alone, it follows that heating the blast with such gases as now practiced affords only the advantage of the temperature of the gases and not their fuel value. My process affords both and is more efficient than heating the blast with fuel, since the gases are already hot, the cost of installation is comparatively small, all fuel is saved, and a comparatively small amount of labor and attention is required. When used for treating ores, the full value of fuel is used, and the metals and gangue are left in good condition for mechanical concentration.

In utilizing the heat generated as described for heating air-blasts for furnaces or for heating boilers or for general heating purposes pipes are passed through the compartment containing the metallic oxids of the preferred furnace, which I will now proceed to describe.

Referring by letter to the drawings, A is a furnace having a fire-box $a$ and a feed-door $b$, and B is a cylinder, preferably a revolving cylinder, mounted on rollers $c$ and arranged to receive gases from the furnace after the manner shown in Fig. 1. The said cylinder B, which resembles a Bruckner cylinder, is provided on its inner side with shelves $d$ for roasted ore, Fig. 2, and contains a plurality of air-pipes $e$, which are preferably square in cross-section, as shown, this in order to enable them to serve as shelves and bring metallic oxids and flue-gases in contact to a considerable extent. By this means also the surface of ore exposed is renewed. The speed of the cylinder may be very low or the cylinder may be left idle, as preferred.

The ends of the pipes $e$ remote from the furnace A are designed to be connected with a blast or other source of fluid-pressure supply, which I have deemed it unnecessary to illustrate, while the other ends of the said pipes are arranged to discharge into a receiver C, (shown at the left of Fig. 1,) which receiver is provided with a conduit D for carrying the hot air to the point where it is to be utilized.

While I have shown and described an apparatus for carrying out my process, I desire it distinctly understood that the apparatus may be modeled after any desirable type of roaster or may be of any other construction without affecting my invention.

Having described my invention, what I claim, and desire to secure by Letters Patent, is—

The process described which consists in subjecting metallic oxid to the action of furnace-gases to reduce the metallic oxid to a lower oxid or the metallic state, burn the carbon monoxid present to carbon dioxid, and recover the heat values lost by the incomplete combustion of fuel, at one and the same time, utilizing the heat values so recovered for an extraneous purpose, and admitting air to the metallic oxid at intervals to adapt the same to do its work continuously.

In testimony whereof I have hereunto set my hand in presence of two subscribing witnesses.

JOHN HERMAN.

Witnesses:
H. S. MORROW,
E. B. MOORE.